3,095,271
PRODUCTION OF BORON TRIHALIDES
Glenn H. McIntyre, Jr., Boron, Norman T. Sprouse, Whittier, and Herbert S. Haber, Arcadia, Calif., assignors to United States Borax & Chemical Corporation, Los Angeles, Calif., a corporation of Nevada
No Drawing. Filed Mar. 4, 1960, Ser. No. 12,682
5 Claims. (Cl. 23—205)

This invention is a continuation-in-part application of our application bearing Serial Number 682,759, filed September 9, 1957, now abandoned.

The present invention relates generally to the production of boron trihalides other than the fluoride by reaction of the appropriate halogen with carbon and a boron source such as boric oxide or a suitable alkali metal or alkaline earth metal borate.

Whereas that type of reaction has long been described in the literature, its commercial utilization has been rendered difficult by a variety of practical problems. One of those problems results from the fact that this reaction between boric oxide, carbon and a halide produces undesirable byproducts which interfere with the purity of the final product and which wastes the reactants and consequently causes the reaction to become economically undesirable.

It is, therefore, the principal object of this invention to provide an improved process for the production of boron trihalides which overcomes these and other well known difficulties.

Other objects will appear as the description proceeds.

To the accomplishment of the foregoing and related ends, said invention then comprises the features hereinafter fully described and particularly pointed out in the claims, the following description seting forth in detail certain illustrative embodiments of the invention, these being indicative, however, of but a few of the various ways in which the principle of the invention may be employed.

Broadly stated, the present invention comprises the method of producing boron trichloride which comprises reacting chlorine, carbon and an anhydrous oxygen containing boron material in a reaction zone at a temperature range of from about 400 to about 800° C., removing from the reaction zone gaseous boron trichloride in admixture with a reaction product of boron trichloride and boric oxide, contacting such admixture with finely divided carbon below about 150° C., whereby, said reaction product of boron trichloride and boric oxide disproportionates and boric oxide deposits on said carbon, separating substantially pure boron trichloride therefrom.

It is a well-known fact that the vapor pressure of boric oxide is such that at temperatures of from 400 to 800° C. boric oxide per se does not vaporize. However, we have found that boric oxide in the presence of gaseous boron trichloride at temperatures of from 400–1200° C. reacts to form a new compound, and which compound is carried out of the reaction in admixture with the desired boron trichloride. We have also found that this compound when cooled to a critical temperature, 150° C. or lower, will disproportionate, $B_2O_3$ will deposit out, and the released $BCl_3$ which is substantially pure can be captured as final product. This reaction can be more readily demonstrated by the following equation:

$$B_2O_3 \cdot BCl_3 \text{ or } 3BOCl \rightleftharpoons BCl_3 + B_2O_3$$

Whether the mechanism of the foregoing equation is completely correct is immaterial to the present invention. The fact remains that boric oxide in the presence of boron trichloride at elevated temperatures forms a reaction product which is carried out of the reaction zone, and we have found that such reaction product can be disproportionated by cooling to a critical temperature, the boric oxide can be made to deposit on finely divided carbon and the released boron trichloride can be captured as final product.

It is quite apparent that this carry-over of boric oxide as the reaction product from $B_2O_3$ and $BCl_3$ has the disadvantage of wasting a portion of the boron initially supplied, thereby increasing the cost of materials. This carry-over has the further disadvantage that as the gaseous reaction products are processed to separate the boron trihalide from other components of the gaseous mixture, the boric oxide tends to deposit progressively out of the gas stream. That leads to a solid accumulation which is typically widely distributed throughout the apparatus and which is troublesome and expensive to dispose of.

Satisfactory disposal of the boric oxide is not an isolated problem, but is also intimately related to other difficulties in the economical production of boron trihalides. Unless conditions of the reaction are very carefully controlled, a portion of the initial halogen tends to be carried over with the gaseous reaction products, and must be separated from the boron trihalide product. Moreover, side reactions may add further impurities to the product, some of which are very difficult to separate. For example, in the production of boron trichloride the reaction may take place in accordance with the typical formula $$B_2O_3 + 3Cl_2 + 3C \rightarrow 2BCl_3 + 3CO$$

It may be mentioned for completeness that the reaction may also take place in such away as to produce carbon dioxide rather than carbon monoxide. This is of no direct consequence to the present invention, and it will simply be understood, whether specifically mentioned or not in the present specification and claims, that carbon monoxide in the reaction product may be accompanied by carbon dioxide. However, under conditions of the reaction, gaseous chlorine also tends to react with carbon monoxide to produce carbon oxychloride, commonly known as phosgene ($COCl_2$). That side product is particularly troublesome because it cannot readily be separated from boron trichloride, due to their almost identical boiling points and general chemical similarity.

We have discovered that those difficulties may be substantially eliminated by providing excess carbon to the reaction and controlling the supply of chlorine in such a way, with regard to the effective length of the reaction zone and other conditions of the reaction, that all chlorine gas is consumed well within the reaction zone. However, that does not by itself provide a practicable solution to the problem. That is because the same conditions which eliminate halogen and troublesome gaseous by-products from the delivered gases appear to increase the amount of the reaction product from $B_2O_3$ and $BCl_3$ that is carried over. It may be that when the bed of hot solid reactants extends beyond the point at which substantially all halogen has been consumed by the reaction, the out-flowing stream of boron trihalide has a greater opportunity to react with the boric oxide and produce the undesirable reaction product.

In accordnace with a further aspect of the invention, the boric oxide which is deposited upon the surfaces of the finely divided carbon can be used for production of more boron trichloride. After deposit of an appreciable concentration of boric oxide on such finely divided carbon in a batch or continuous operation, the latter is then removed together with the deposited boric oxide from the gas stream and is supplied, for example in admixture with other solid reactants, to the reaction zone. In that way the boric oxide can be recycled, and be ultimately utilized substantially completely.

The finely divided carbon provided as a deposition surface for the boric oxide should be thoroughly dehydrated. Such dehydration may be accomplished by heating the carbon to a relatively high temperature, for example 700 to 1000° C. A particularly desirable manner of obtaining such dehydrated carbon, in accordance with the invention, is to employ excess carbon that has been supplied to the reaction zone and has been removed unreacted therefrom as solid carbon. Such unreacted carbon is typically completely free of water. After such carbon has been used to take up boric oxide from the gaseous reaction mixture, it can be supplied, together with the deposited boric oxide, to the reaction zone without further treatment.

A full understanding of the invention and of its further objects and advantages will be had from the following description of an illustrative manner of carrying it into operation. For the sake of definiteness and clarity the detailed operation of the invention will be described as it relates illustratively to the product of boron trichloride by a substantially continuous process. However, particulars of that description are intended only for illustration and not as a limitation of the scope of the invention, which is defined in the appended claims.

A typical reaction vessel comprises a vertical carbon tube having its outer surface sealed by a tube of high-density ceramic material, the carbon tube and the outer ceramic tube being enclosed within a steel shell. The top of the reaction vessel is provided with means for admitting solid granular or powdered material without permitting introduction or escape of undesired gases; and a corresponding structure is provided for removing solid reaction products at the bottom of the vessel. Those structures may, for example, comprise gas locks of known type. Suitable means are also provided for flushing the interior of the reaction vessel and the lock spaces with a dry inert gas such as carbon dioxide. The reaction vessel is additionally provided with an inlet tube for admitting a gaseous halide at an accurately controlled rate and a gas outlet from the upper portion of the vessel for conducting away the gaseous reaction products.

Suitable heating means, typically electric, are provided for heating material within the carbon tube; and the upper portion of the vessel is constructed so as to constitute a preheating zone for solid material entering the reaction vessel, and the lower portion of the vessel is so constructed as to provide a preheating zone for the entering halogen, and the central portion, well within the carbon tube, constitutes the reaction chamber.

In operation of such a system for the production of boron trihalide, the reaction chamber is filled with an intimate mixture of carbon and a suitable waterfree boron source such as anhydrous sodium or calcium borate, boric oxide or a mixture of the same. For clarity of description, the boron source will be referred to as boric oxide ($B_2O_3$), but without meaning thereby to limit the scope of the invention. The carbon and boric oxide are introduced into the upper portion of the vessel and preferably roasted at a temperature of 700 to 1000° C. to remove substantially all traces of water and other hydrogen-containing impurities. The solid reaction mixture is then supplied via the gas lock to the reaction chamber. The solid charge may contain a molar ratio of carbon to boric oxide of from 1 to about 10. For the present illustrative type of continuous operation a very considerable excess of carbon is preferably provided. Typically, from about 4 to about 8 times the stoichiometric amount of carbon is found satisfactory.

When the halogen is chlorine, for example, the reaction typically takes place at a temperature of at least 600° C. and preferably at 700 to 800° C. or higher. For production of boron tribromide and boron triiodide considerably higher reaction temperatures, such as 1000 to 1200° C., may be desirable.

The chlorine or other halide is supplied sufficiently slowly so that it is completely consumed well within the reaction chamber. Any phosgene or similar gaseous product of side reactions that may be produced is then substantially or wholly transformed, in absence of gaseous chlorine, to boron trihalide and carbon monoxide before leaving the reaction chamber.

The rate of movement of the solid reactants through the reaction zone is preferably so controlled that all of the entering boron is carried off with the gases, either as boron trihalide or as the reaction product of $B_2O_3$ and the boron trihalide. The residue of the solid charge, consisting essentially or wholly of carbon, when the boron source is straight boric oxide, and consisting essentially of carbon and alkali metal or alkaline earth metal halide when the boron source includes borate, moves downward in the reaction column and is removed at the bottom of the vessel through the gas lock provided for that purpose. The recovered carbon typically amounts to approximately 40 to 70% by weight of the initial solid charge introduced.

The reaction gas stream as it leaves the reaction vessel is passed through a chamber, preferably provided with cooling means.

Suitable valve means are provided at the top and bottom of the chamber for admitting and removing, respectively, a suitable solid particulate material, with which the interior of the chamber is filled. That material is a granular or powdered substances that is inert with respect to boron trihalide at the temperature of the chamber.

For example, the chamber can be filled with the granular carbon which is removed as residue from the reaction in the reaction vessel. Such carbon can be delivered to the chamber by suitable means which preferably permits the carbon to cool but which prevents appreciable absorption of atmospheric water. The column of granular material in the chamber is maintained by coolant means or otherwise at a temperature sufficiently low to insure complete removal of boric oxide from the gas stream. For example, boric oxide is substantially wholly disproportionated from the gas stream by maintaining the solid carbon in the chamber below about 150° C. and moving the gas stream at a velocity which provides a residence time in the vessel of at least approximately 15 seconds. The solid carbon is preferably kept below about 125° C., which typically gives quantitative deposition of the boric oxide.

The gas stream leaving the chamber is thus substantially or completely free of boric oxide. It can then be processed by known means to separate the boron trihalide from other gases, which are then discarded. The recovery apparatus may be greatly simplified, as compared to the best available previous practice, because the gas stream is essentially free of boric oxide and is also essentially free of halogen gas and of side reaction products such as carbon oxychloride. Hence, all that is necessary to recover the boron trihalide product in pure form is to separate out the fixed gases, carbon monoxide and carbon dioxide and any gaseous trace impurities that may result from sources such as minor contaminants in the initial ingredients.

Many other detailed manners of operation will be understood to be embraced within the scope of the invention. Procedures of the type described have the great advantage that all boric oxide initially supplied is ultimately consumed usefully in the production of the desired boron trihalide. The invention thus provides for the first time a practical and economical manner of obtaining essentially 100% utilization of all three reactants, halogen gas, carbon and boron source.

Other modes of applying the principle of the invention may be employed provided the features stated in any of the following claims or the equivalent of such be employed.

We, therefore, particularly point out and claim as our invention:

1. In the process of making boron trichloride by reaction of chlorine, carbon and an anhydrous oxygen containing boron material at a temperature range of from about 400 to about 800° C., the step which comprises removing from the reaction zone gaseous $BCl_3$ in an admixture with a reaction product comprising gaseous $BCl_3$ and $B_2O_3$, contacting such admixture with finely divided carbon at a temperature below about 150° C. whereby said reaction product of $BCl_3$ and $B_2O_3$ disproportionates, and $B_2O_3$ deposits on the surfaces of said carbon and substantially pure $BCl_3$ is obtained therefrom.

2. The method of claim 1 which comprises recycling the carbon containing the deposited $B_2O_3$ to the reaction zone as reaction ingredients.

3. The method of claim 1 wherein the said boron material is an anhydrous material selected from the group consisting of boric oxide, alkali metal borates and alkaline earth metal borates.

4. In the process of making boron trichloride by reaction of chlorine, carbon and an anhydrous oxygen containing boron material selected from the group consisting of boric oxide, alkali metal borates and alkaline earth metal borates in a first reaction zone at a temperature range of from about 400 to 800° C., the improvement which comprises removing from said first reaction zone gaseous $BCl_3$ in admixture with a gaseous reaction product comprising $BCl_3$ and $B_2O_3$, passing said admixture into a second reaction zone containing finely divided carbon at a temperature of from about 100 to about 150° C. whereby said reaction product comprising $BCl_3$ and $B_2O_3$ disproportionates and $B_2O_3$ deposits on the surfaces of said carbon, and separating substantially pure $BCl_3$ from said second reaction zone.

5. The method of claim 4 which comprises recycling the carbon containing the deposited $B_2O_3$ from said second reaction zone to said first reaction zone whereby said carbon and deposited $B_2O_3$ are used as reaction ingredients in said first reaction zone.

References Cited in the file of this patent
UNITED STATES PATENTS

| | | |
|---|---|---|
| 2,097,482 | Weber et al. | Nov. 2, 1937 |
| 2,607,440 | Lewis | Aug. 19, 1952 |
| 2,675,294 | Keith | Apr. 13, 1954 |
| 3,019,089 | O'Hara | Jan. 30, 1962 |
| 3,051,553 | Caro et al. | Aug. 28, 1962 |

FOREIGN PATENTS

| | | |
|---|---|---|
| 588,269 | Canada | Dec. 1, 1959 |